(12) United States Patent  
Kariyama

(10) Patent No.: US 7,261,188 B2
(45) Date of Patent: Aug. 28, 2007

(54) BICYCLE BRAKE CALIPER ASSEMBLY

(75) Inventor: Osamu Kariyama, Sakai (JP)

(73) Assignee: Shimano Inc., Osaka (JP)

( * ) Notice: Subject to any disclaimer, the term of this patent is extended or adjusted under 35 U.S.C. 154(b) by 255 days.

(21) Appl. No.: 11/107,842

(22) Filed: Apr. 18, 2005

(65) Prior Publication Data

US 2006/0231351 A1   Oct. 19, 2006

(51) Int. Cl.
*B62L 5/00* (2006.01)
(52) U.S. Cl. .................... 188/26; 188/73.32
(58) Field of Classification Search ............. 188/26, 188/73.32, 344, 18 A, 24.11, 73.33
See application file for complete search history.

(56) References Cited

U.S. PATENT DOCUMENTS

| 2,918,990 | A |   | 12/1959 | Davis |
|---|---|---|---|---|
| 3,433,328 | A | * | 3/1969 | Swift ..................... 188/72.4 |
| 3,605,956 | A | * | 9/1971 | Hahm et al. ............. 188/73.32 |
| 3,783,980 | A | * | 1/1974 | Kallmeyer ............... 188/73.32 |
| 5,538,105 | A | * | 7/1996 | Rike ...................... 188/73.32 |
| 6,318,514 | B1 |   | 11/2001 | Hinkens et al. |

| 2002/0079175 | A1 |   | 6/2002 | Ueda et al. |
|---|---|---|---|---|
| 2003/0192748 | A1 |   | 10/2003 | Lumpkin |
| 2004/0026188 | A1 |   | 2/2004 | Emmett et al. |
| 2004/0216968 | A1 | * | 11/2004 | Donadoni et al. ....... 188/73.39 |
| 2006/0042890 | A1 |   | 3/2006 | Samuelsson |

FOREIGN PATENT DOCUMENTS

| EP | 1228955 A | | 8/2002 |
|---|---|---|---|
| JP | 55112430 A | * | 8/1980 |
| JP | 08145090 A | * | 6/1996 |
| JP | 10-213167 A | | 8/1998 |
| JP | 10213167 | | 8/1998 |
| WO | WO 2004/046577 | | 6/2004 |
| WO | WO-2004-046577 A1 | | 6/2004 |

\* cited by examiner

*Primary Examiner*—Thomas Williams
(74) *Attorney, Agent, or Firm*—Global IP Counselors, LLP

(57) ABSTRACT

A bicycle brake caliper is disclosed that includes a brake caliper, a brake pad retaining member and a cover. The brake caliper is configured to selectively apply a braking force on a bicycle brake disc. The brake caliper includes a housing that has a brake pad access opening. The brake pad retaining member is removably installed on the brake caliper and extends into the brake pad access opening. A cover is at least partially retained within the brake pad access opening of the housing by the brake pad retaining member.

15 Claims, 18 Drawing Sheets

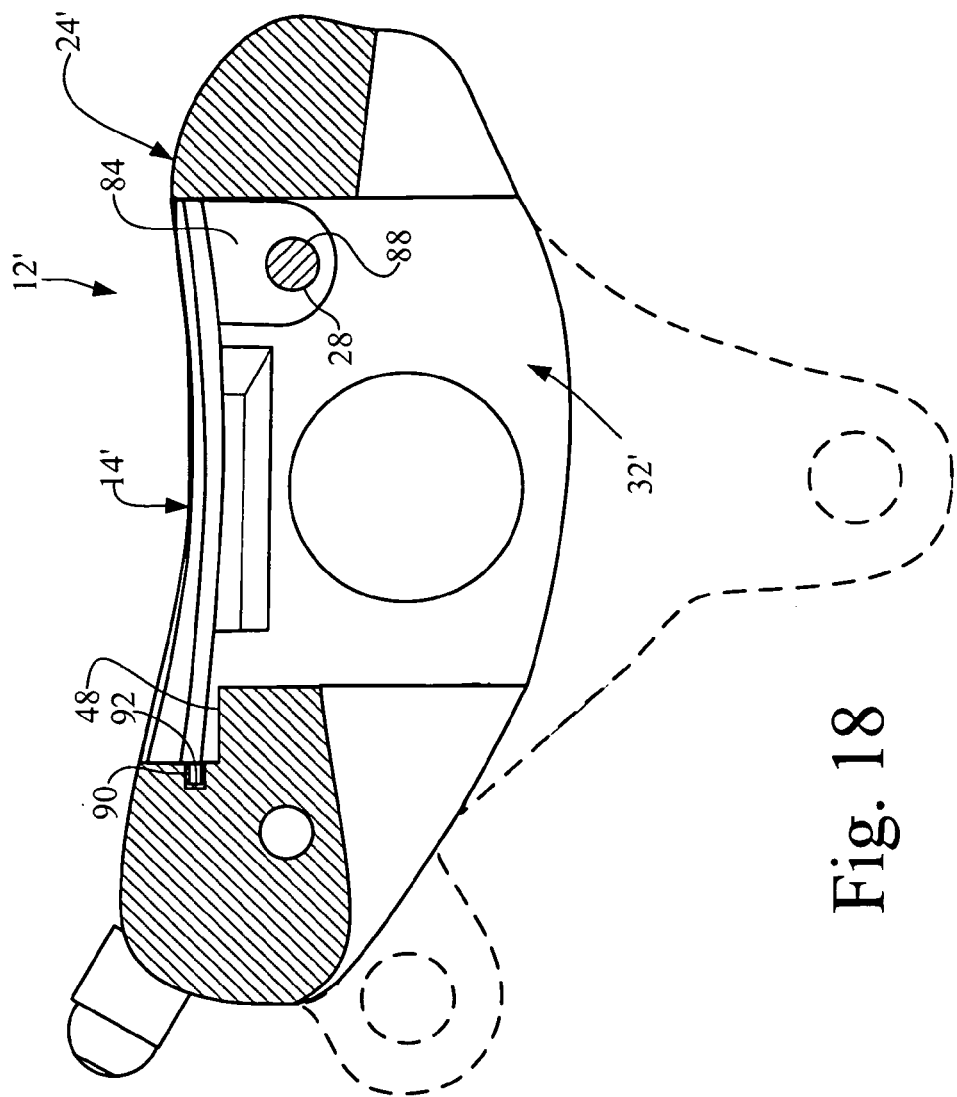

BICYCLE BRAKE CALIPER ASSEMBLY

BACKGROUND OF THE INVENTION

1. Field of the Invention

This invention generally relates to a bicycle brake caliper assembly having a protective cover. More specifically, the present invention relates to a bicycle brake caliper assembly having a removable cover for a bicycle brake caliper assembly, where the cover is retained by a brake pad retaining member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

One component of bicycles that has been extensively redesigned is the bicycle braking system. In recent years, hydraulic braking systems have been added to bicycles that include a braking disc mounted to one of the wheels of the bicycle, and a hydraulically actuated brake caliper assembly. The brake caliper assembly typically includes one or two hydraulically operated pistons that engage a pair of braking pads that in turn selectively contact the braking disc. The braking pads are preferably installed in an easily accessed opening formed in the brake caliper assembly.

However, if debris, such as gravel, small stones, mud and water, gets into the opening of the brake caliper assembly, the piston, braking pads and braking disc can become abraded.

In view of the above, it will be apparent to those skilled in the art from this disclosure that there exists a need for an improved brake caliper assembly that prevents the ingress of debris onto the piston, braking pads and braking disc. This invention addresses this need in the art as well as other needs, which will become apparent to those skilled in the art from this disclosure.

SUMMARY OF THE INVENTION

One object of the present invention is to provide protection for braking parts of a brake caliper assembly.

Another object of the present invention is to provide a brake caliper assembly with an easily removable cover.

The foregoing objects can basically be attained by providing a bicycle with bicycle brake caliper assembly that includes a brake caliper, a brake pad retaining member and a cover. The brake caliper is configured to selectively apply a braking force on a bicycle brake disc. The brake caliper includes a housing formed with a brake pad access opening. The brake pad retaining member is removably installed on the brake caliper and extends into the brake pad access opening. The cover is at least partially retained within the brake pad access opening of the housing by the brake pad retaining member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 18 is a cross sectional side view of the brake caliper assembly similar to FIG. 9 with the cover installed in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
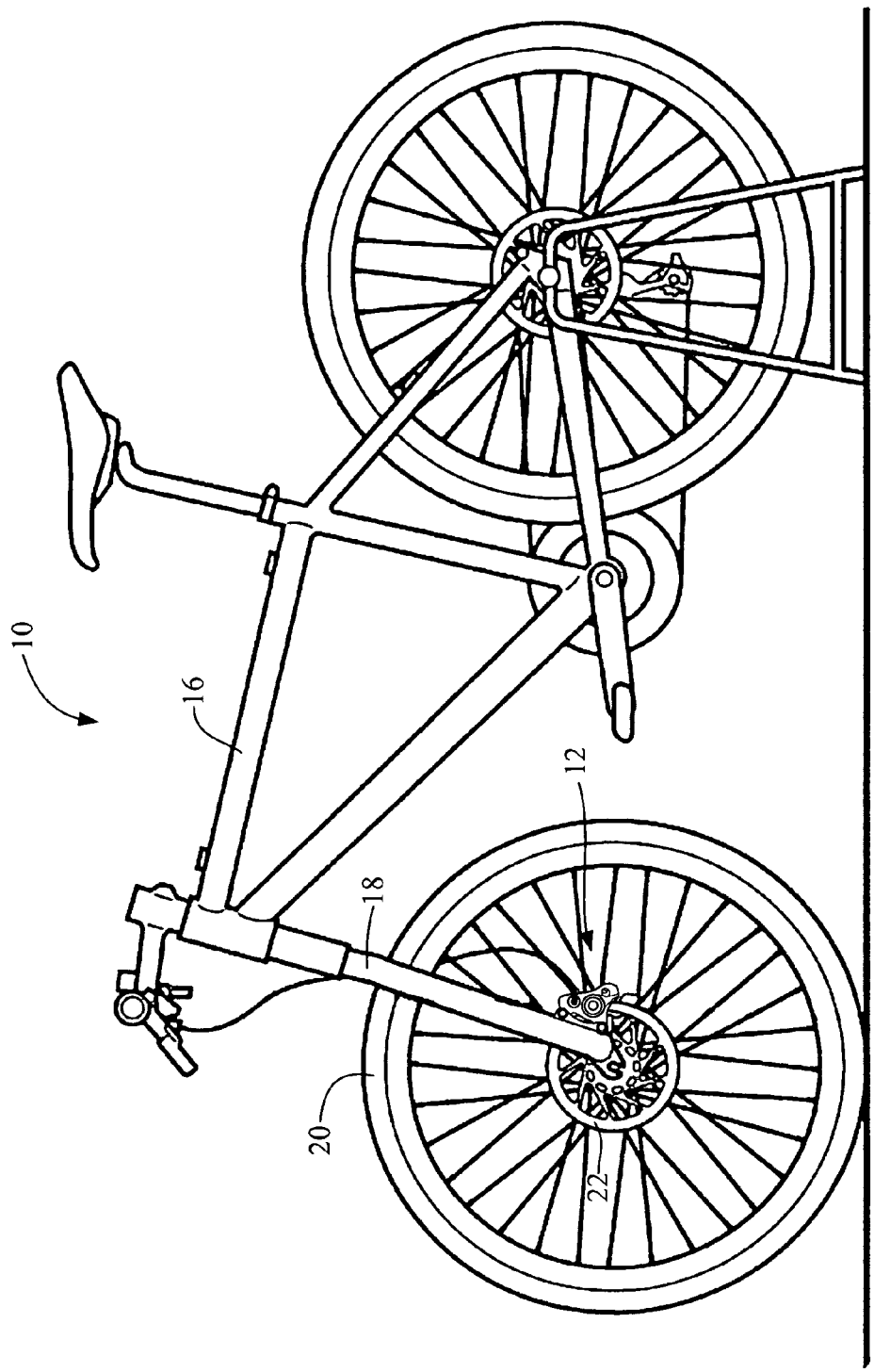
FIG. 1 is a side elevational view of a bicycle that includes a brake caliper assembly mounted on a front fork of the bicycle proximate a front wheel and brake disc in accordance with a first embodiment of the present invention.

Referring initially to FIG. 1, a bicycle 10 having a bicycle brake caliper assembly 12 is illustrated in accordance with a first embodiment of the present invention. The bicycle brake caliper assembly 12 is provided with a cover 14 (FIG. 4) that covers and protects components of the bicycle brake caliper assembly 12 from the elements, as is described in greater detail below.

As shown in FIG. 1, the bicycle 10 includes a frame 16, a front fork 18 pivotally supported on the frame 16, a front wheel 20 rotatably supported on the front fork 18 and a brake disc 22 fixed to the front wheel 20 in a conventional manner for rotation with the front wheel 20.

Figure 2:
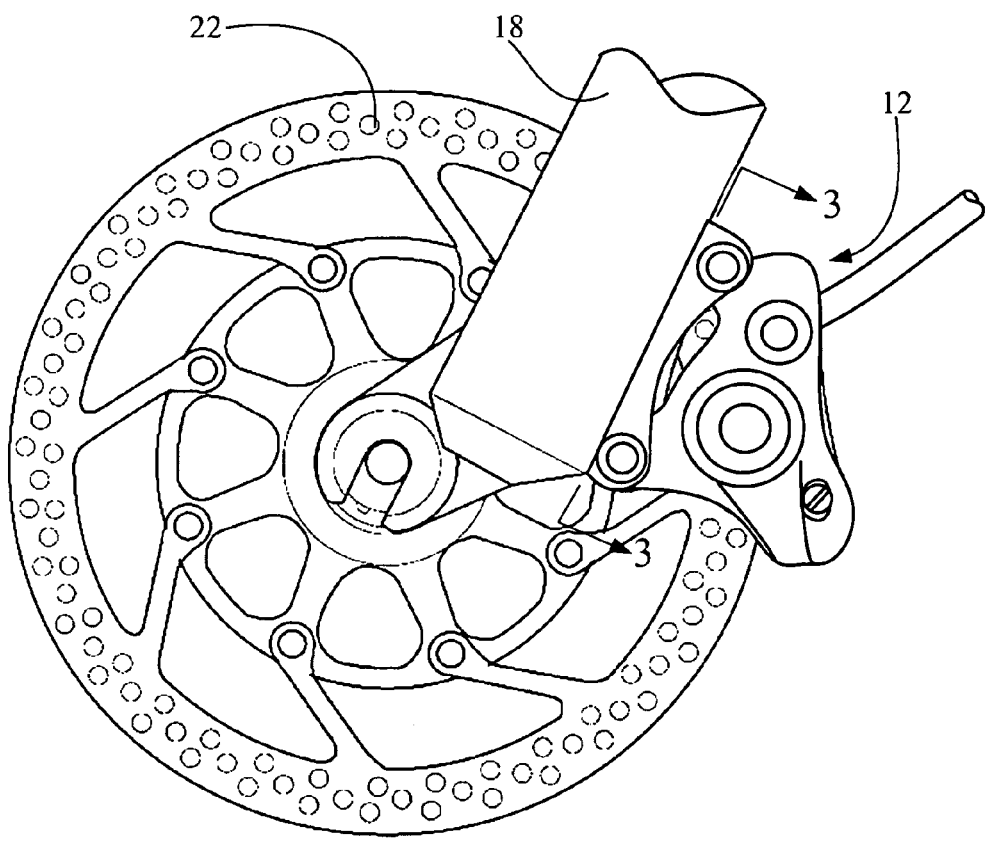
FIG. 2 is an enlarged view of the brake caliper assembly and brake disc with the wheel removed to provide greater clarity in accordance with the first embodiment of the present invention.
Figure 3:
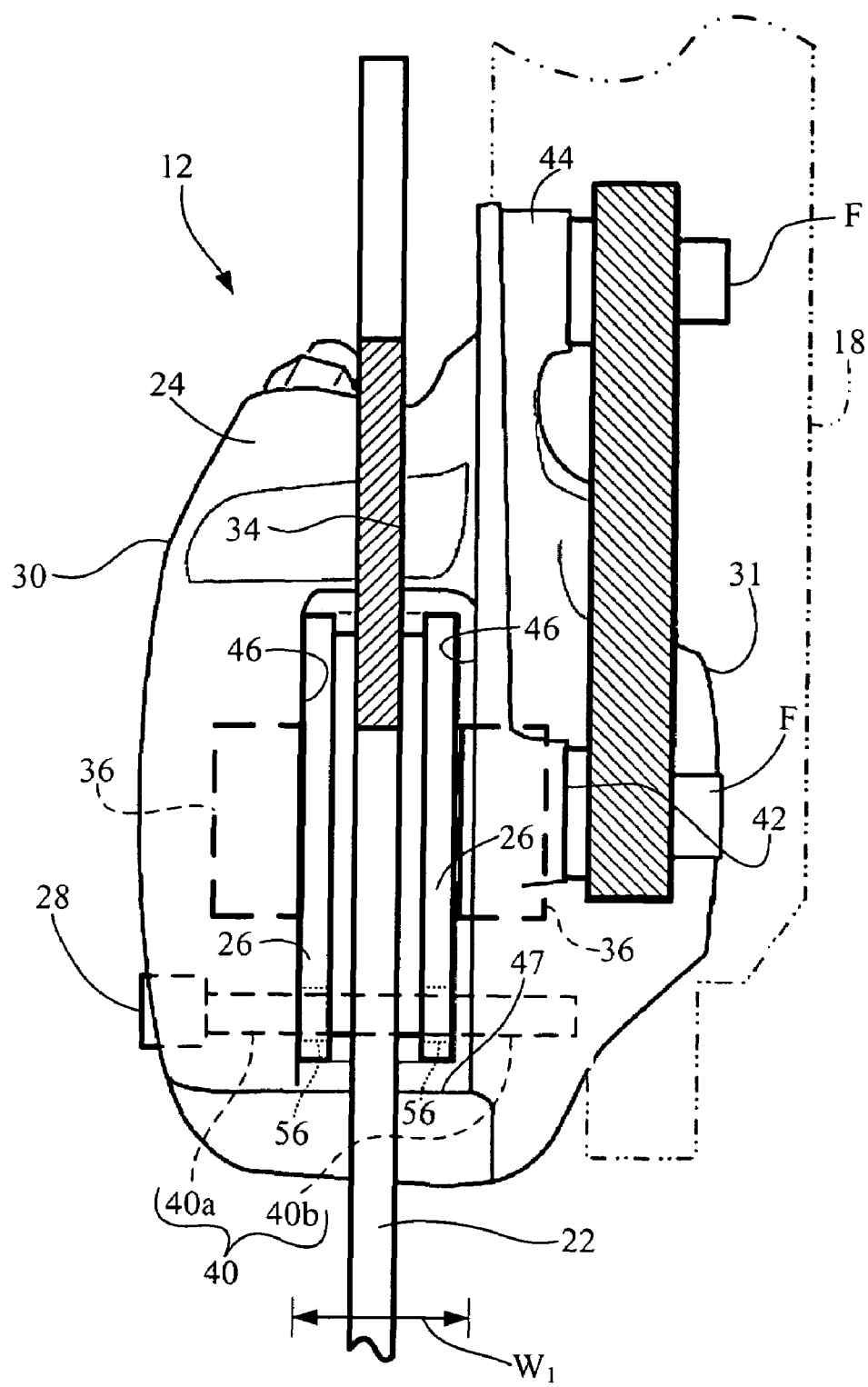
FIG. 3 is a part cross sectional view, part plan view of the brake caliper assembly taken along the lines 3-3 in FIG. 2 in accordance with the first embodiment of the present invention.

As shown in FIGS. 2 and 3, the bicycle brake caliper assembly 12 is fixedly supported on front fork 18 such that a portion of the brake disc 22 extends into a partially hollow interior of the bicycle brake caliper assembly 12, as is described in greater detail below. As such, the bicycle brake caliper assembly 12 is configured to selectively apply a braking force on the brake disc 22 in a conventional manner.

Figure 4:
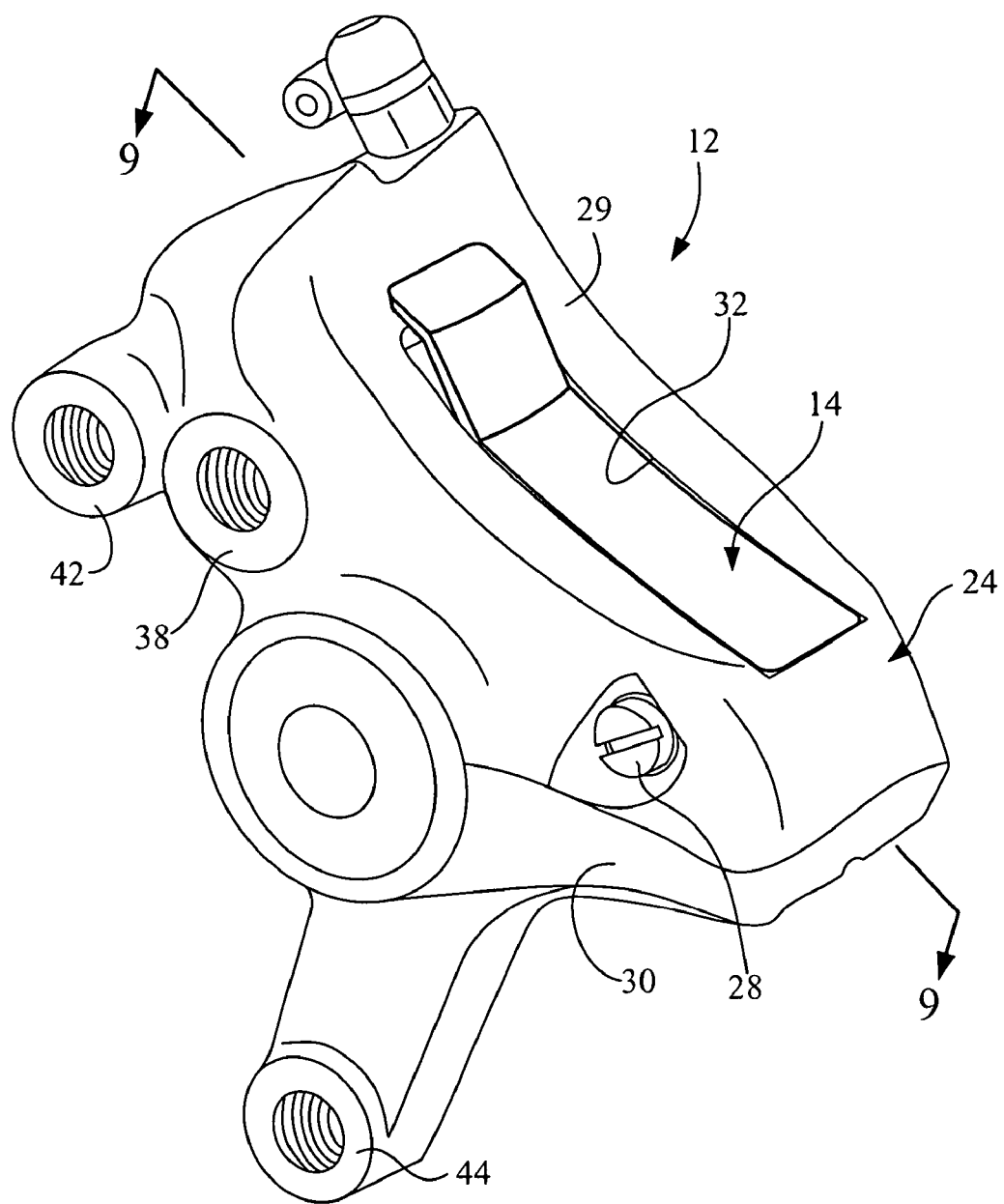
FIG. 4 is perspective view of the brake caliper assembly shown removed from the bicycle with a cover installed within a brake pad access opening formed in the brake caliper assembly, in accordance with the first embodiment of the present invention.
Figure 5:
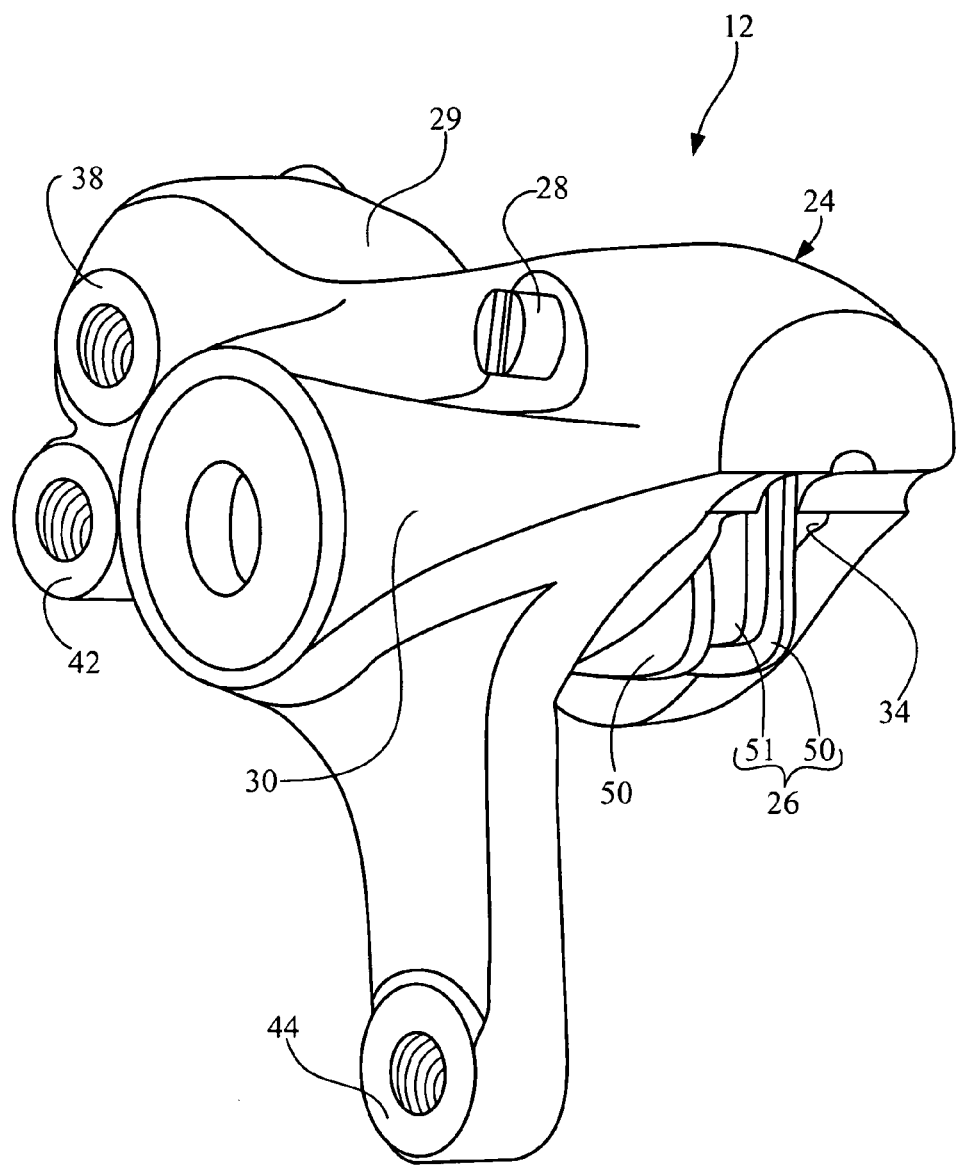
FIG. 5 is a perspective view of the brake caliper assembly shown at a different angle than in FIG. 4, showing a disc receiving recess with brake pads installed in the brake pad access opening in accordance with the first embodiment of the present invention.
Figure 6:
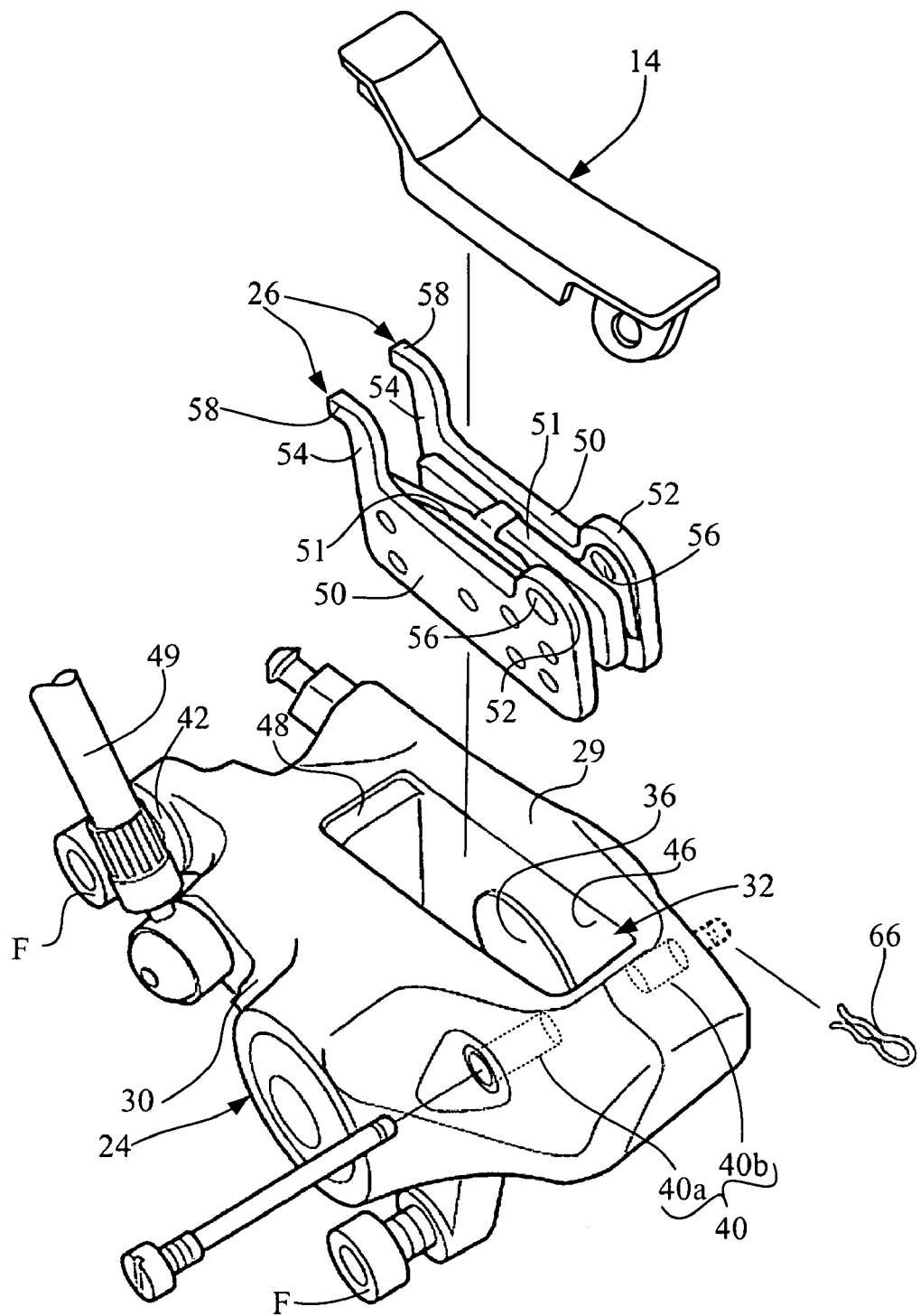
FIG. 6 is an exploded perspective view of the brake caliper assembly showing the brake pads, a brake pad retaining member and cover in accordance with the first embodiment of the present invention.

As shown in FIGS. 3-6, the bicycle brake caliper assembly 12 basically includes a housing 24, a pair of brake pads 26 (FIGS. 3, 5 and 6), a brake pad retaining member 28 and the cover 14 (FIGS. 4 and 6). The cover 14 is provided to protect various components of the bicycle brake caliper assembly 12 within housing 24 from the elements, including water and debris.

The housing 24 includes a first outer surface 29 (FIGS. 4-6), a second outer surface 30, a third outer surface 31 (FIG. 3), a brake pad access opening 32 (FIGS. 4-6), a disc receiving recess 34, a pair of hydraulic pistons 36, a hydraulic line receiving opening 38 (FIGS. 4-6), a retaining member aperture 40 and first and second attachment flanges 42 and 44.

The first outer surface 29 is an outwardly facing surface that is exposed to the elements when the bicycle brake caliper assembly 12 is installed on the bicycle 10. Further, when properly installed on the bicycle 10, the first outer surface 29 faces rearward and upward relative to the bicycle 10, as indicated in FIGS. 1 and 2.

The second outer surface 30 is a curved contoured surface that includes portions that are generally perpendicular to the first outer surface 29. The second outer surface 30 faces outward toward the side relative to the bicycle 10 when the bicycle brake caliper assembly 12 is installed on the bicycle 10.

The third outer surface 31 (shown in FIG. 3) is a contoured surface that includes portions that are generally perpendicular to the first outer surface 29 and portions that are generally parallel to the second outer surface 30. The third outer surface 31 faces the front wheel 20 of the bicycle 10 when the bicycle brake caliper assembly 12 is installed on the bicycle 10.

Figure 8:
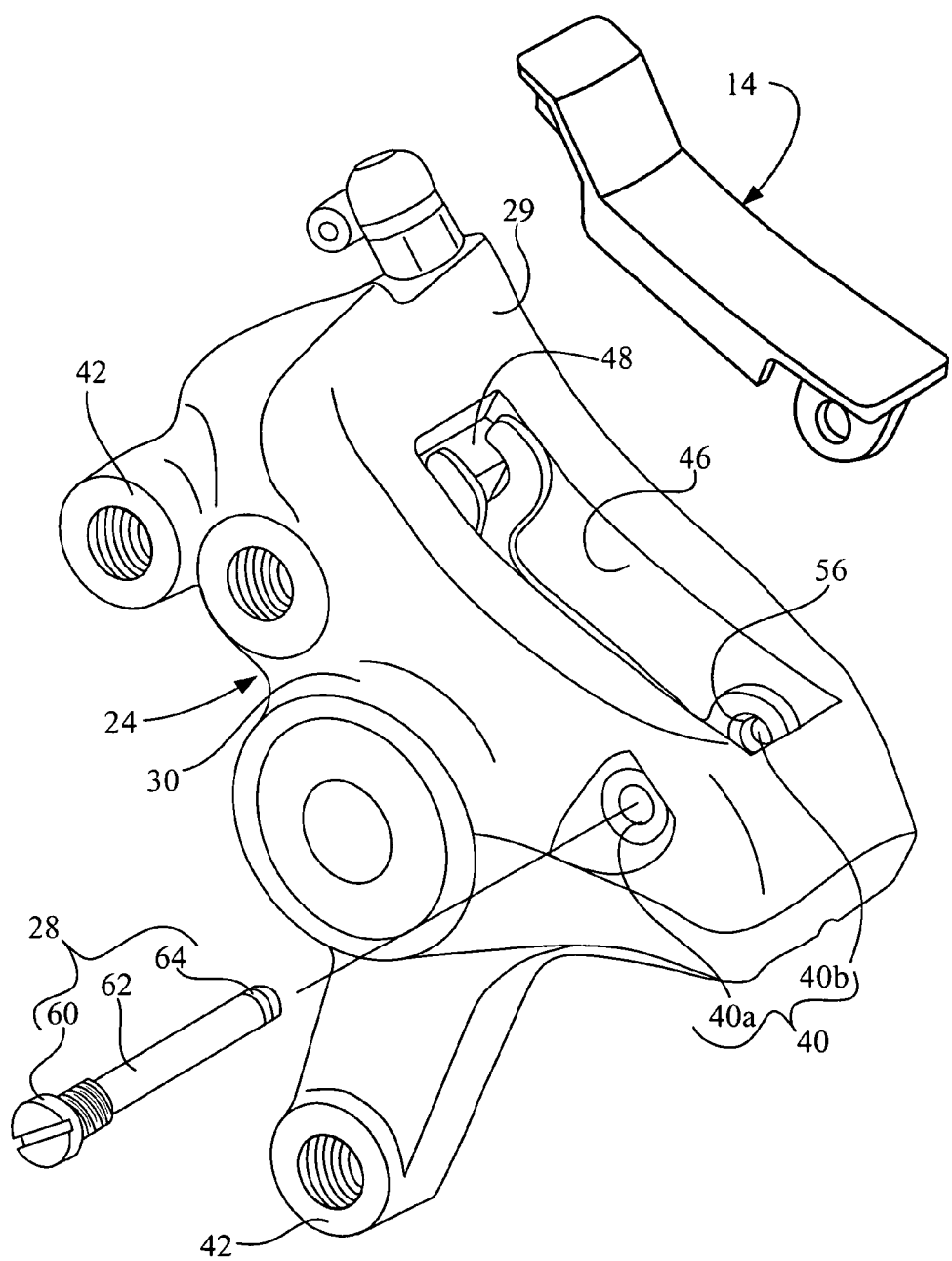
FIG. 8 is an exploded perspective view of the brake caliper assembly similar to FIG. 4, showing the cover and the brake pad retaining member removed to reveal the brake pads installed in the brake pad access opening in accordance with the first embodiment of the present invention.
Figure 9:
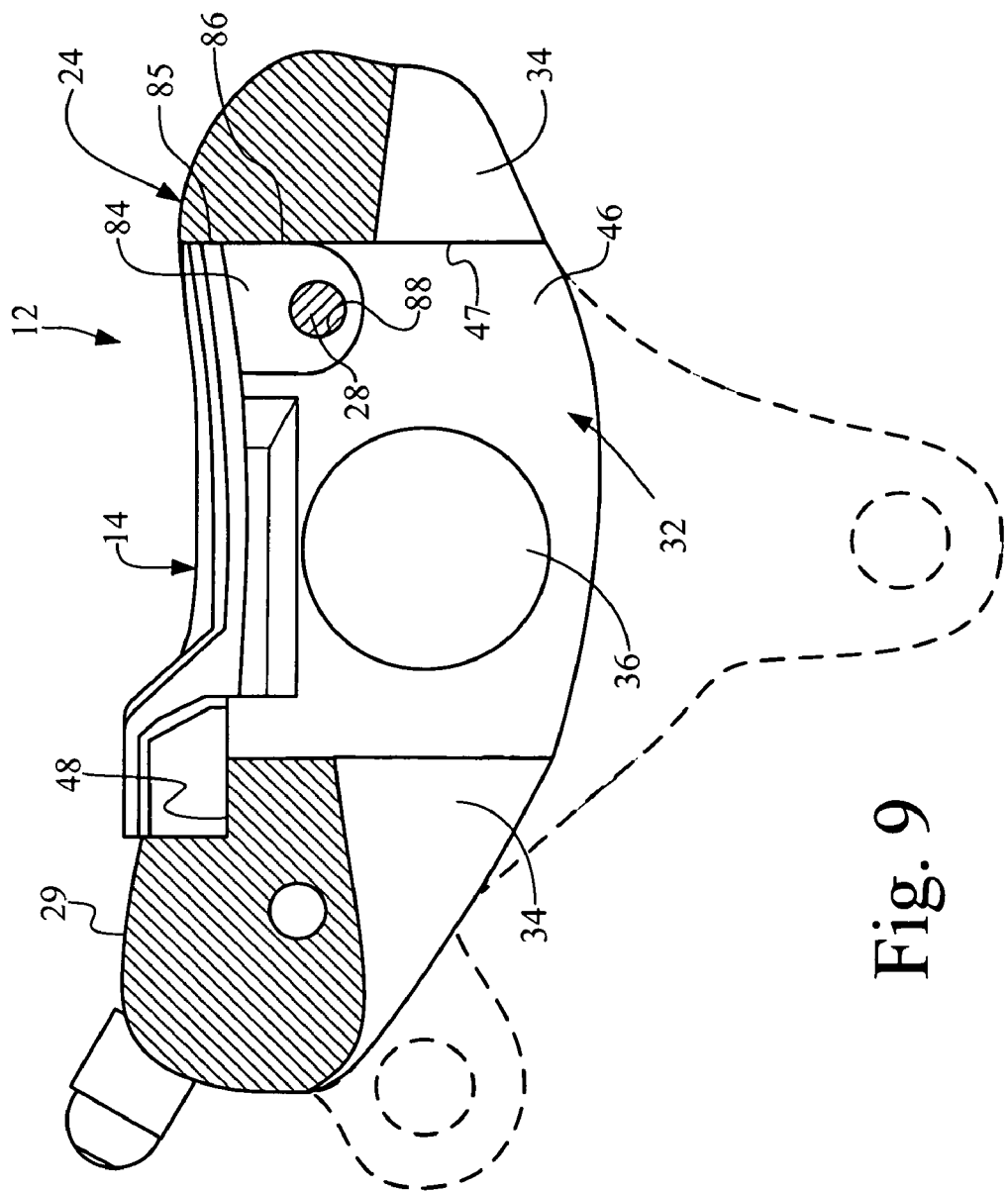
FIG. 9 is a cross sectional side view of the brake caliper assembly taken along the line 9-9 in FIG. 4 in accordance with the first embodiment of the present invention.
Figure 10:
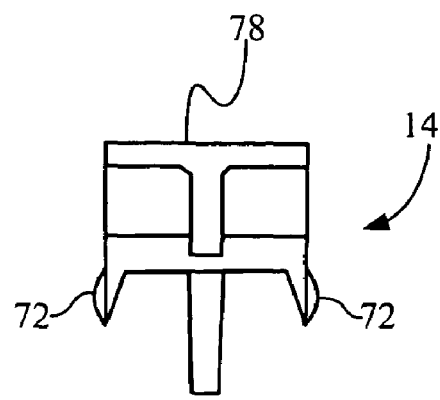
FIG. 10 is a first end elevational view of the cover shown removed from the brake caliper assembly in accordance with the first embodiment of the present invention.

The brake pad access opening 32 is formed in the first outer surface 29 of the housing 24 and extends completely through the housing 24. Specifically, the brake pad access opening 32 extends through the housing 24 from the first outer surface 29 to the disc receiving recess 34, as shown in FIG. 9. The brake pad access opening 32 includes a pair of side walls 46 (FIGS. 3 and 9) and an end wall 47 (FIG. 9) that is perpendicular to the side walls 46. The brake pad access opening 32 extends from the first outer surface 29 to the disc receiving recess 34. The brake pad access opening 32 is also formed with a brake pad shoulder 48 (FIGS. 6, 8 and 9). As shown in FIG. 3, the side walls 46 of the brake pad access opening 32 are spaced apart by a first width $W_1$ measured in a direction approximately parallel to the lengthwise direction of the brake pad retaining member 28.

As shown in FIG. 9, the disc receiving recess 34 is formed on a side of the housing 24 opposite the first outer surface 29. The disc receiving recess 34 extends in a direction that is approximately perpendicular to the brake pad access opening 32. The disc receiving recess 34 and the brake pad access opening 32 intersect and are open to one another.

As is indicated in FIG. 3, the pair of hydraulic pistons 36 are installed in bores (not numbered) within the housing 24 in a conventional manner. The hydraulic pistons 36 are arranged on opposite sides of the brake pad access opening 32. In response to hydraulic pressure, the hydraulic pistons 36 are urged to move toward one another and into contact with the pair of brake pads 26, thereby urging the brake pads 26 into contact with the brake disc 22 in a conventional manner.

The hydraulic line receiving opening 38 is configured to receive a hydraulic line 49 as shown in FIG. 6. The hydraulic line 49 is connected to a brake actuator (not shown) that selectively provides hydraulic pressure for controlling movement of the hydraulic pistons 36.

As shown in FIGS. 3 and 6, the retaining member aperture 40 includes two portions, a first aperture 40a and a second aperture 40b. The first aperture 40a is formed in the second outer surface 30 and extends to the brake pad access opening 32. The first aperture 40a is spaced slightly apart from the first outer surface 29 of the housing 24. The second aperture 40b extends from the brake pad access opening 32 to the third surface 31.

The first and second attachment flanges 42 and 44 are formed with threaded apertures that receive fasteners F(FIGS. 3 and 6) that fix the housing 24 to the front fork 18, as shown in FIGS. 2 and 3.

When the bicycle brake caliper assembly 12 is assembled, the pair of brake pads 26 are inserted into the brake pad access opening 32, as indicated in the exploded depicted in FIG. 6. When the bicycle brake caliper assembly 12 is installed on the bicycle 10, the brake disc 22 extends part way into the disc receiving recess 34, with one brake pad 26 disposed on each side of the brake disc 22, as shown in FIG. 3.

As shown in FIG. 6, each of the pair of brake pads 26 is formed with a backing plate 50, a brake lining 51, a first retaining flange 52 and a second retaining flange 54. The first retaining flange 52 is formed with a retaining aperture 56, and the second retaining flange 54 is formed with a hook 58. When the pads are installed in the brake pad access opening 32, the hook 58 engages the brake pad shoulder 48, as indicated in FIG. 8.

Figure 7:
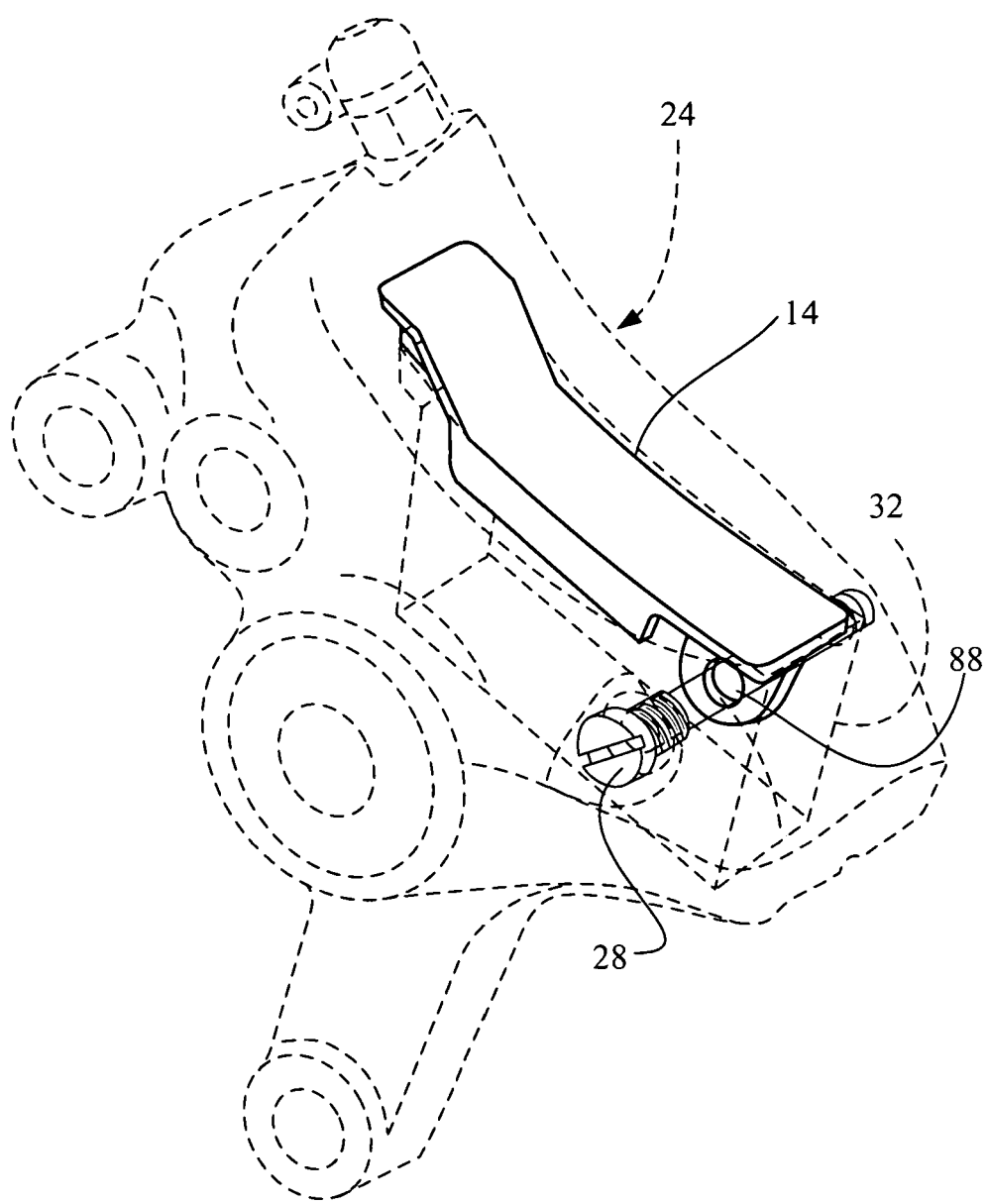
FIG. 7 is a perspective view of the cover and the brake pad retaining member, with the brake caliper assembly shown in phantom in accordance with the first embodiment of the present invention.

The brake pad retaining member 28 is an elongated fastening pin that is basically formed with a head 60, a shaft portion 62 and an annular recess 64 at a distal end thereof, as shown in FIGS. 6 and 8. The brake pad retaining member 28 is dimensioned such that the shaft portion 62 extends through both the first aperture 40a and the second aperture 40b of the retaining member aperture 40 of the housing 24, as shown in FIGS. 3, 6 and 7. Specifically, once installed in the housing 24, the shaft portion 62 of the brake pad retaining member 28 extends into the aperture 40a of the retaining member aperture 40 and into the brake pad access opening 32. The shaft portion 62 then extends into the aperture 40b of the retaining member aperture 40 and completely through the housing 24. Once through the housing 24, the distal end of the shaft portion 62 extends through the third surface 31 of the housing 24 such that a retaining clip 66 can be attached to the annular recess 64, as indicated in FIG. 6. The head 60 of the brake pad retaining member 28 and the clip 66 retain the brake pad retaining member 28 in position in the housing 24.

When the brake pad retaining member 28 is installed in the retaining member aperture 40 of the housing 24, the shaft portion 62 is extends into each of the retaining apertures 56 of the first retaining flange 52 of the pair of brake pads 46. In this manner, the brake pad retaining member 28 retains the pair of brake pads 46 in position within the housing 24. As well, the shaft portion 62 of the brake pad retaining member 28 also retains the cover 14 in position on the housing 24, as is explained in greater detail below.

The cover 14 of the present invention is now described in greater detail with specific reference to FIGS. 7-15. The cover 14 is configured to cover the brake pad access opening 32 thereby protect the pair of brake pads 26 and the hydraulic pistons 36 from the elements, debris and dirt. As is explained below, the cover 14 is at least partially retained within brake pad access opening 36 of housing 24 by brake pad retaining member 28.

The cover 14 basically includes a cover portion 68, an attachment end 70, and two side walls 72. The cover 14 is preferably made a plastic or polymer based material.

Figure 11:
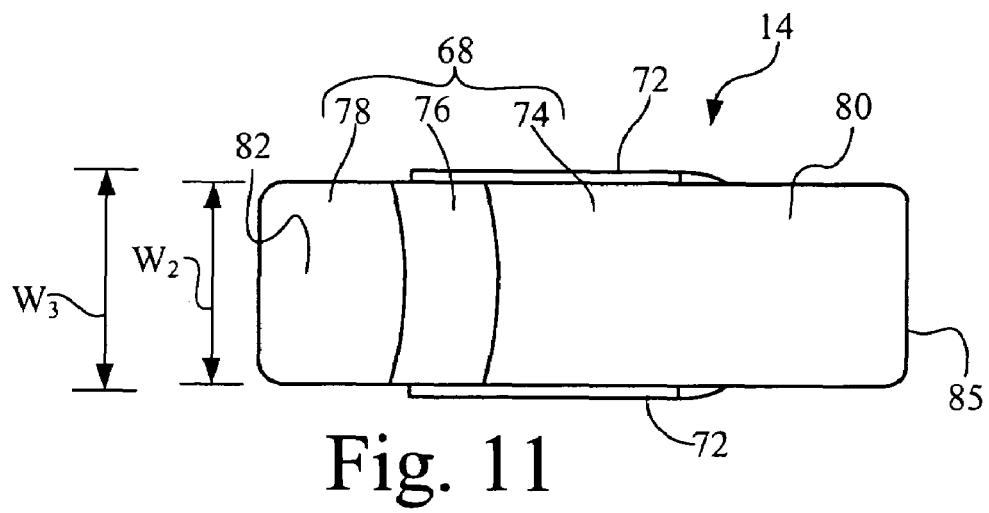
FIG. 11 is a top plan view of the cover in accordance with the first embodiment of the present invention.
Figure 12:
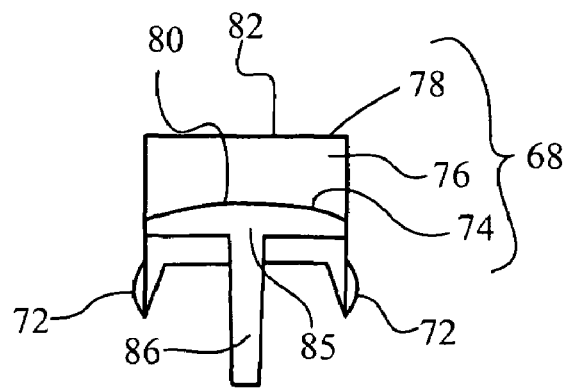
FIG. 12 is a second end elevational view of the cover in accordance with the first embodiment of the present invention.
Figure 13:
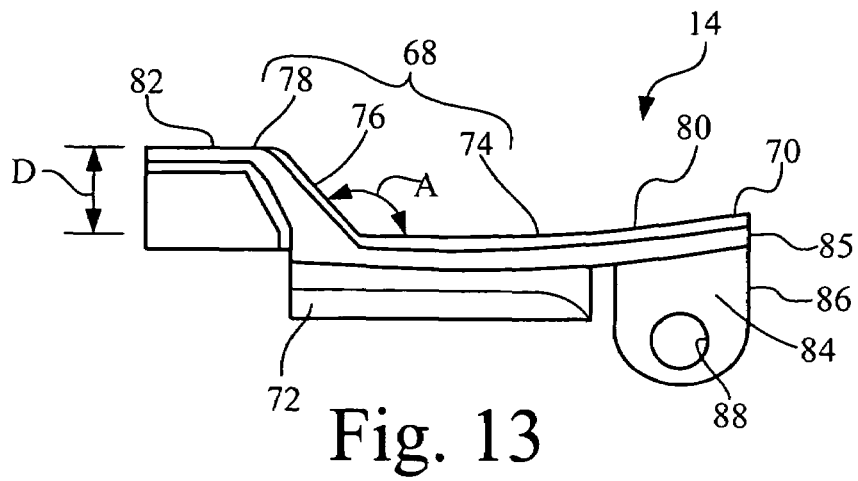
FIG. 13 side elevational view of the cover in accordance with the first embodiment of the present invention.
Figure 14:
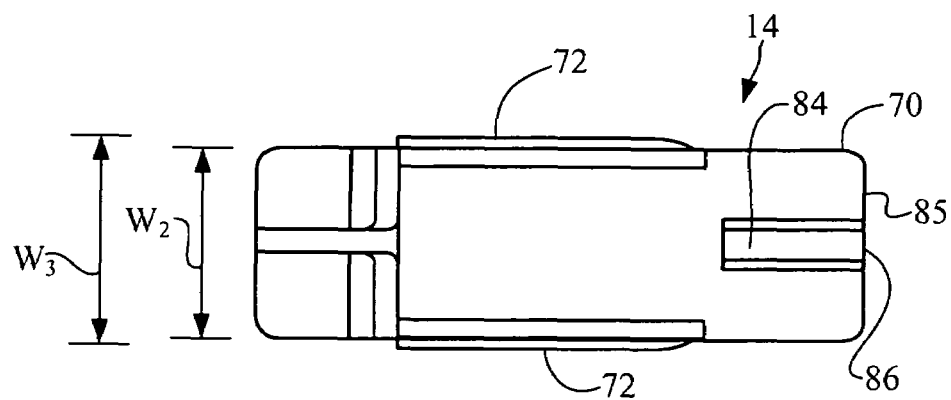
FIG. 14 is a bottom plan view of the cover in accordance with the first embodiment of the present invention.
Figure 15:
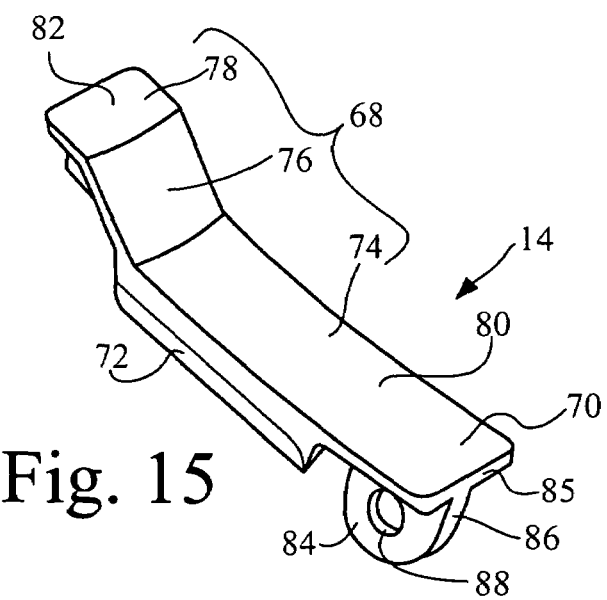
FIG. 15 perspective view of the cover in accordance with the first embodiment of the present invention.

The cover portion 68 of the cover 14 includes a main section 74, a transition section 76 and an offset section 78. The main section 74 has an outer surface 80 that has a slightly curved contour as shown in FIGS. 12, 13 and 15. As shown in FIGS. 4 and 7, the cover portion 68 covers a substantial portion of the brake pad access opening 32. The transition section 76 is formed at an angle A with respect to the main section 74, the angle being approximately between 110 and 180 degrees, as indicated in FIG. 13. The transition section 76 is formed between the main section 74 and the offset section 78. The main section 74, the transition section 76 and the offset section 78 of the cover portion 68 are formed with a second width $W_2$ as shown in FIGS. 11 and 14.

The offset section 78 has an outer surface 82 that is basically flat and is generally parallel to the orientation of the outer surface 80 of the main section 74. Further, the outer surface 82 of the offset section 78 is offset by a distance D from the outer surface 80 of the main section 74, as shown in FIG. 13. As can be noted from the drawings, the offset section 78 extends away from the main section 74. As shown in FIGS. 4 and 7, the offset section 78 extends away from the brake pad access opening 32 such that the offset section 78 covers a small portion of the first outer surface 29 of the housing 24 adjacent to the brake pad access opening 32.

The attachment end 70 is formed with a retaining portion 84 and a generally flat surface 85. The retaining portion 84 is a generally flat projection or flange that extends perpendicularly away from the cover portion 68. The retaining portion 84 also extends from the attachment end 70 in a direction opposite the outer surface 80 of the main section 74 of the cover 14.

The retaining portion 84 is formed with a movement restricting end 86 and a retaining member aperture 88. The movement restricting end 86 has a generally straight edge that extends perpendicularly downward from the generally flat surface 85 (as shown in FIGS. 9 and 15). Further, the movement restricting end 86 is preferably an extension of the generally flat surface 85. The movement restricting end 88 also extends in a direction generally parallel to the two side walls 46, when installed in the brake pad access opening 32 of the housing 24. The retaining member aperture 88 is dimensioned and oriented to receive the shaft portion 62 of the brake pad retaining member 28 when installed in the brake pad access opening 32 of the housing 24.

When the cover 14 is installed in the brake pad access opening 32, the brake pad retaining member 28 prevents the cover 14 from movement in or out of the brake pad access opening 32 of the housing 24. Further, the movement restricting end 86 and the generally flat surface 85 contact the end wall 47 and prevents the cover 24 from rotating about brake pad retaining member 28. Consequently, only one brake pad retaining member 28 is required to keep the cover 24 securely retained in the brake pad access opening 32 of the housing 24.

The two side walls 72 of the cover 14 are formed on opposing longitudinal edges of the cover portion 68. The two side walls 72 extend in directions generally perpendicular to the outer surface 80 of the cover 14. However, as indicated in FIGS. 11, 12 and 14, the side walls 72 of the cover 14 extend slightly outward away from one another, in a diverging manner. At their ends (widest diverging ends), the side walls 72 are spaced apart from one another by a third width $W_3$, as shown in FIGS. 11 and 14. It should be noted that the two side walls 72 are arranged such that the movement restricting end 88 is approximately centered between the two side walls 72.

With the cover 14 installed in the brake pad access opening 32, the two side walls 72 confront the side walls 46 of the brake pad access opening 32. Further, with the cover 14 installed in the brake pad access opening 32, the two side walls 72 preferably contact the side walls 46 of the brake pad access opening 32. Consequently, the third width $W_3$ between the two side walls 72 is preferably approximately the same as or greater than the first width $W_1$ of the brake pad access opening 32. Further, it should be noted that the second width $W_2$ of the cover portion 68 is slightly less than the third width $W_3$ between the two side walls 72 and the second width $W_2$ of the cover portion 68.

While it is preferable that the two side walls 72 of the cover 14 contact the side walls 46 of the brake pad access opening 32, such a dimensional relationship is not required for practicing the invention. Alternatively, the second width $W_2$ of the cover portion 68 and the third width $W_3$ between the two side walls 72 of the cover 14 can be dimensioned such that there is a negligible gap present between the two side walls 72 of the cover 14 and the side walls 46 of the brake pad access opening 32.

As described above, the cover 14 covers the brake pad access opening 32 and protects the hydraulic pistons 36 and the pair of brake pads 26 against contamination by debris and the elements in a simple manner. In order to inspect or replace the brake pads 26, the brake pad retaining member 28 is easily removed and reinstalled.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

A second embodiment of the present invention will now be described. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the earlier embodiments will be indicated with a single prime ('), or will be provided with a new reference numeral.

Figure 16:
FIG. 16 is a side view of a cover in accordance with a second embodiment of the present invention.
Figure 17:
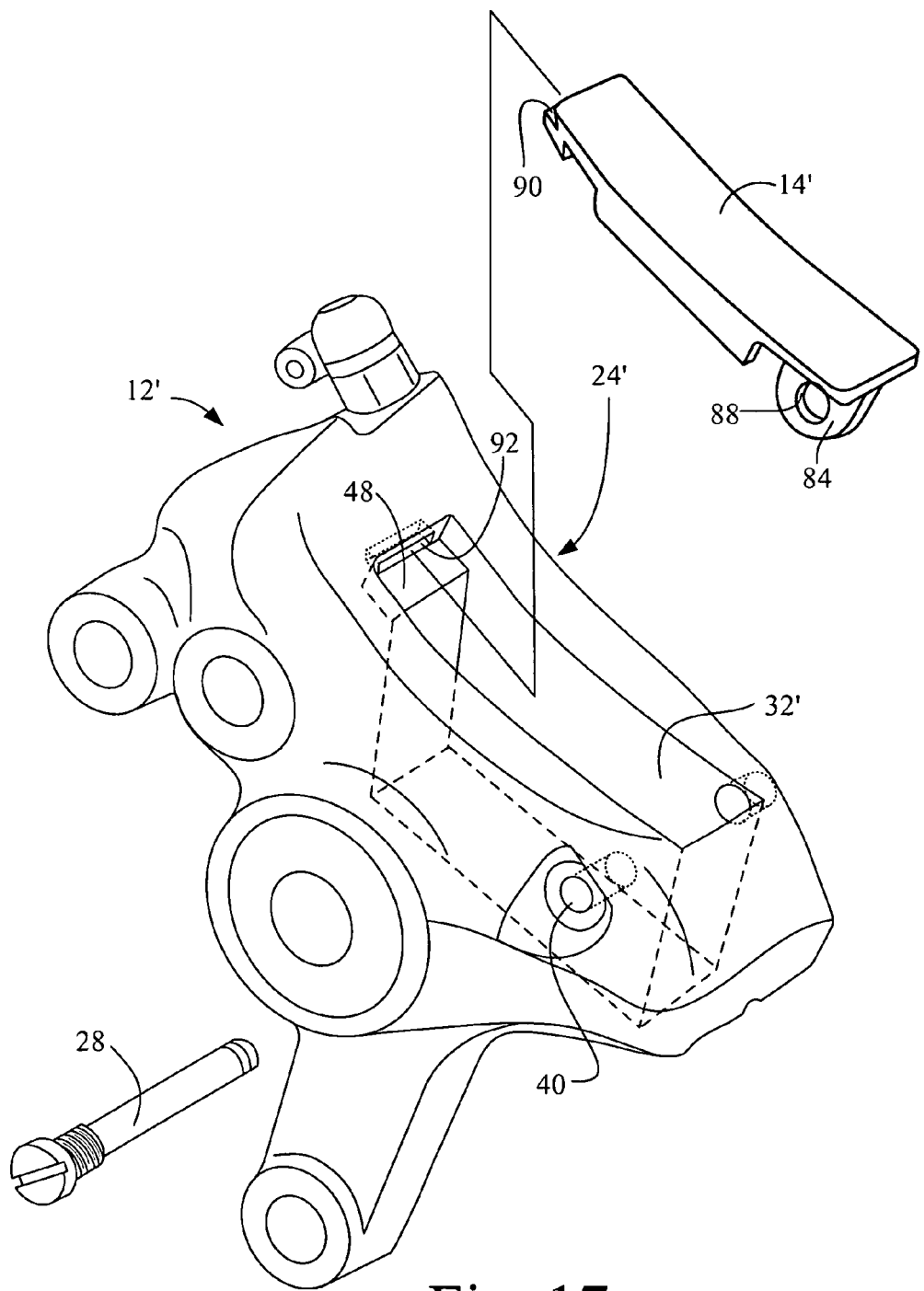
FIG. 17 is an exploded perspective view of a brake caliper assembly showing the cover depicted in FIG. 16 and a brake pad retaining member removed to reveal a brake pad access opening in accordance with the second embodiment of the present invention.
Figure 20:
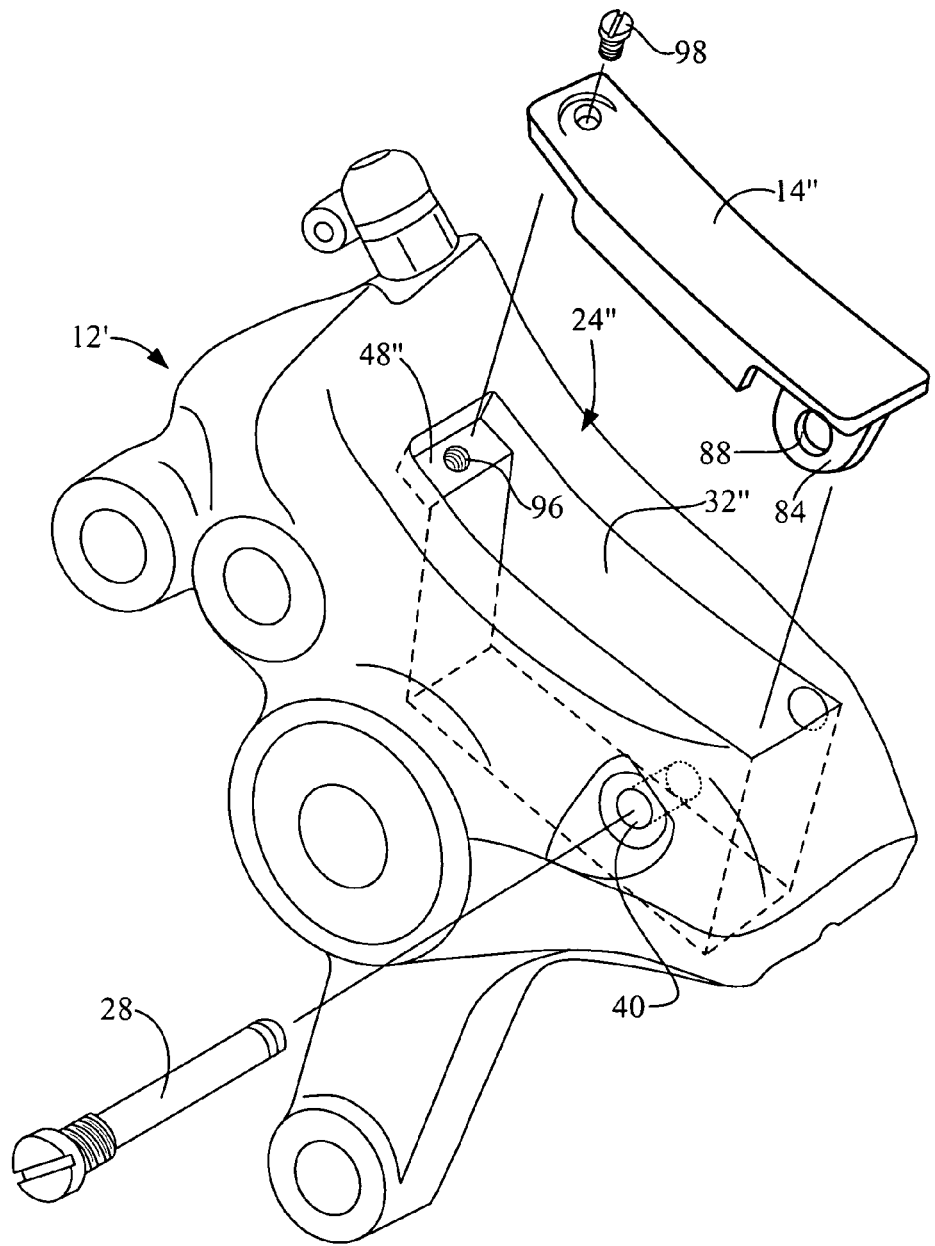
FIG. 20 is an exploded perspective view of a brake caliper assembly showing the cover depicted in FIG. 19 and a brake pad retaining member removed to reveal a brake pad access opening in accordance with the third embodiment of the present invention.

The second embodiment of the present invention is depicted in FIGS. 16, 17 and 18 and includes a cover 14' that is removably retained in a brake pad access opening 32' of a housing 24' of a bicycle brake caliper assembly 12'.

The cover 14' is generally the same as the cover 14 of the first embodiment, except that the cover 14' includes a protrusion 90 at an end of the cover 14' opposite the retaining portion 84.

The housing 24' is generally the same as the housing 24 of the first embodiment except that the housing 24' includes a recess 92 adjacent to the brake pad shoulder 48.

In the second embodiment, when installing the cover 14' into the brake pad access opening 32', the protrusion 90 of the cover 14' is first inserted into the recess 92 of the housing 24'. Next, the brake pad retaining member 28 is inserted into the retaining member aperture 40 and through the retaining member aperture 88 in the retaining portion 84 of the cover 14'.

Third Embodiment

A third embodiment of the present invention will now be described. In view of the similarity between the first, second and third embodiments, the parts of the third embodiment that are identical to the parts of the first and second embodiments will be given the same reference numerals as the parts of the first and second embodiment. Moreover, the descriptions of the parts of the third embodiment that are identical to the parts of the first and second embodiments may be omitted for the sake of brevity. The parts of the third embodiment that differ from the parts of the earlier embodiments will be indicated with a double prime (") or will be provided with a new reference numeral.

Figure 19:
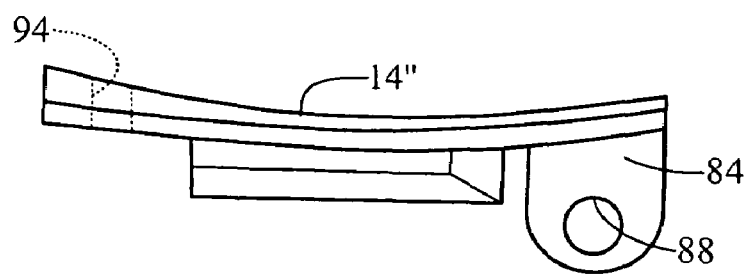
FIG. 19 is a side view of a cover in accordance with a third embodiment of the present invention.
Figure 22:
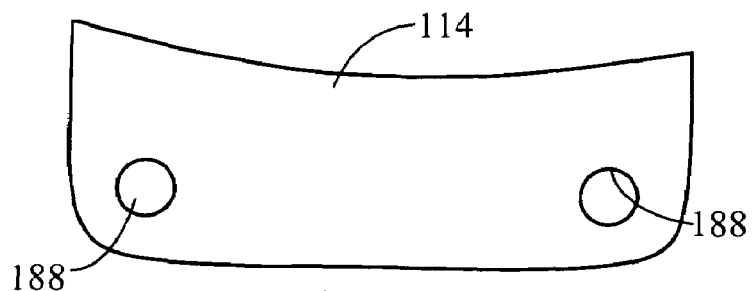
FIG. 22 is a side view of a cover in accordance with a fourth embodiment of the present invention.
Figure 23:
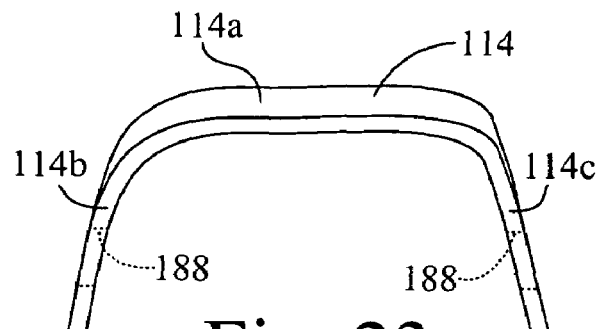
FIG. 23 is an end view of the cover in accordance with the fourth embodiment of the present invention.
Figure 21:
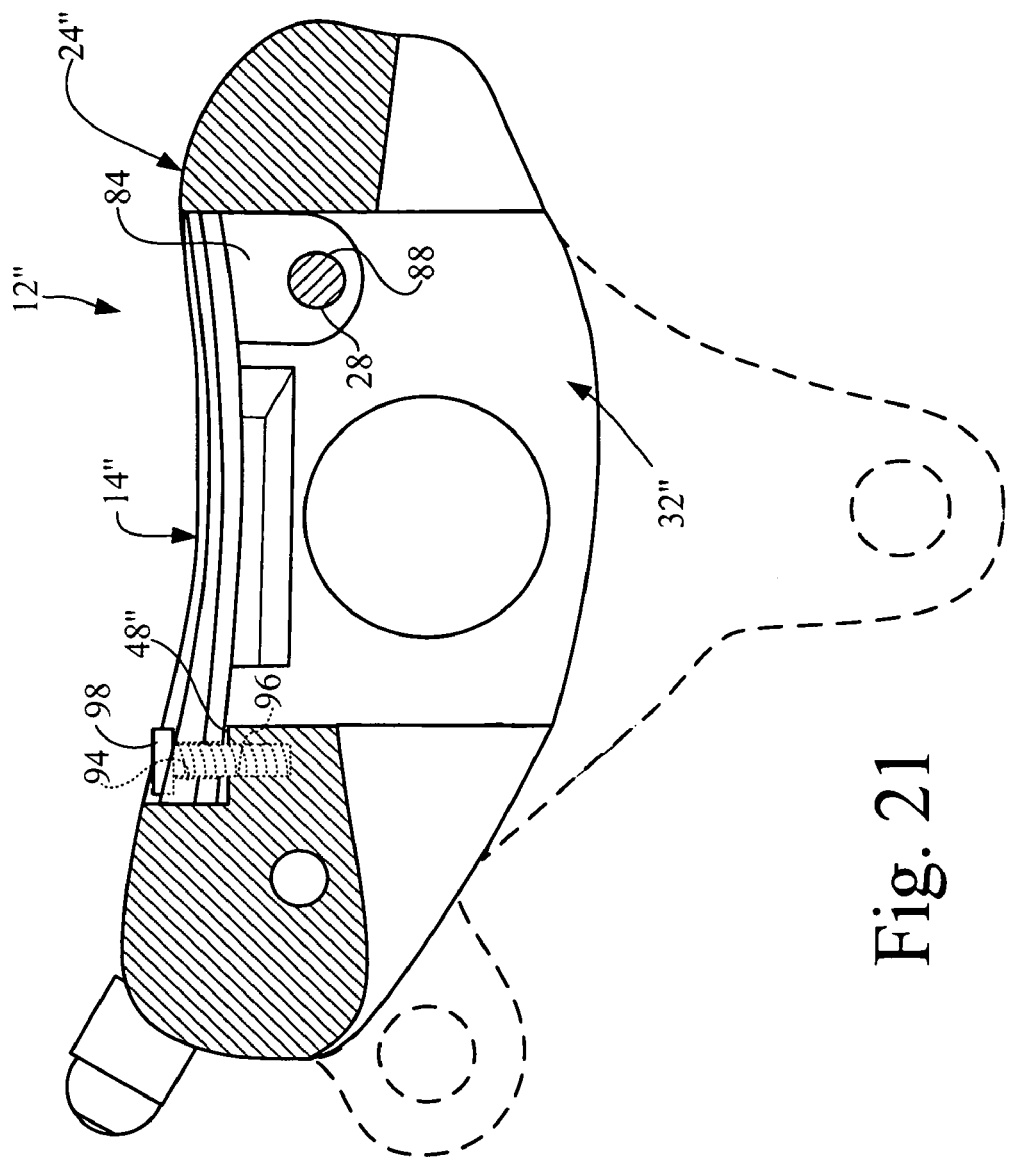
FIG. 21 is a cross sectional side view of the brake caliper assembly similar to FIG. 18 with the cover installed in accordance with the third embodiment of the present invention.

The third embodiment of the present invention is depicted in FIGS. 19, 21 and 22 and includes a cover 14" that is removably retained in a brake pad access opening 32" of a housing 24" of a bicycle brake caliper assembly 12".

The cover 14" is generally the same as the cover 14 of the first embodiment, except that the cover 14" includes an aperture 94 at an end of the cover 14" opposite the retaining portion 84.

The housing 24" is generally the same as the housing 24 of the first embodiment except that the housing 24" includes a treaded aperture 96 formed in a brake pad shoulder 48" within the brake pad access opening 32".

In the third embodiment, when installing the cover 14" into the brake pad access opening 32", the brake pad retaining member 28 is inserted into the retaining member aperture 40 and through the retaining member aperture 88 in the retaining portion 84 of the cover 14". Further, a fastener 98 is inserted into the aperture in the cover 14" and further inserted into the threaded aperture 96 in the brake pad shoulder 48. The fastener 98 and the brake pad retaining member 28 fix and retain the cover 14" within the brake pad access opening 32".

Fourth Embodiment

A fourth embodiment of the present invention will now be described. In view of the similarity between the first, second, third and fourth embodiments, the parts of the fourth embodiment that are identical to the parts of the first, second and third embodiments will be given the same reference numerals as the parts of the first, second and third embodiment. Moreover, the descriptions of the parts of the fourth embodiment that are identical to the parts of the first, second and third embodiments may be omitted for the sake of brevity. The parts of the fourth embodiment that differ from the parts of the earlier embodiments will be indicated with a triple prime ('") or will be provided with a new reference numeral.

The fourth embodiment of the present invention is depicted in FIGS. 22, 23, 24 and 25 and includes a cover 114 that is removably retained over a brake pad access opening 32'" of a housing 24'" of a bicycle brake caliper assembly 12'".

The cover 114 is a generally U-shaped structure with a top wall 114a and two side walls 114b and 114c that extend away from the top wall 114a. The side walls 114b and 114c are formed with pairs of retaining member apertures 188.

The housing 24'" is generally the same as the housing 24 of the first embodiment except that the housing 24'" can be formed without the brake pad shoulder 48. Further, the housing 24'" is formed with the retaining member aperture 40 and a second retaining member aperture 40'" adjacent to the hydraulic line receiving opening 38.

The bicycle brake caliper assembly 12'" in the fourth embodiment includes a second brake pad retaining member 28'". Further, bicycle brake caliper assembly 12'" is fitted with brake pads (not shown) that include retaining apertures in both first and second retaining flanges (not shown).

In the fourth embodiment, when installing the cover 114 over the brake pad access opening 32''', the brake pad retaining member 28 is inserted first into a corresponding one of the retaining member apertures 188 in the side walls 114b of the cover 114. Next, the brake pad retaining member 28 is inserted into the aperture 40a of the retaining aperture 40 in the housing 24''', then through the retaining apertures in the first retaining flanges (not shown). The brake pad retaining member 28 then extends into the aperture 40b of the retaining member aperture 40 and through the retaining member aperture 188 on the side wall 114c of the cover 114.

Figure 24:
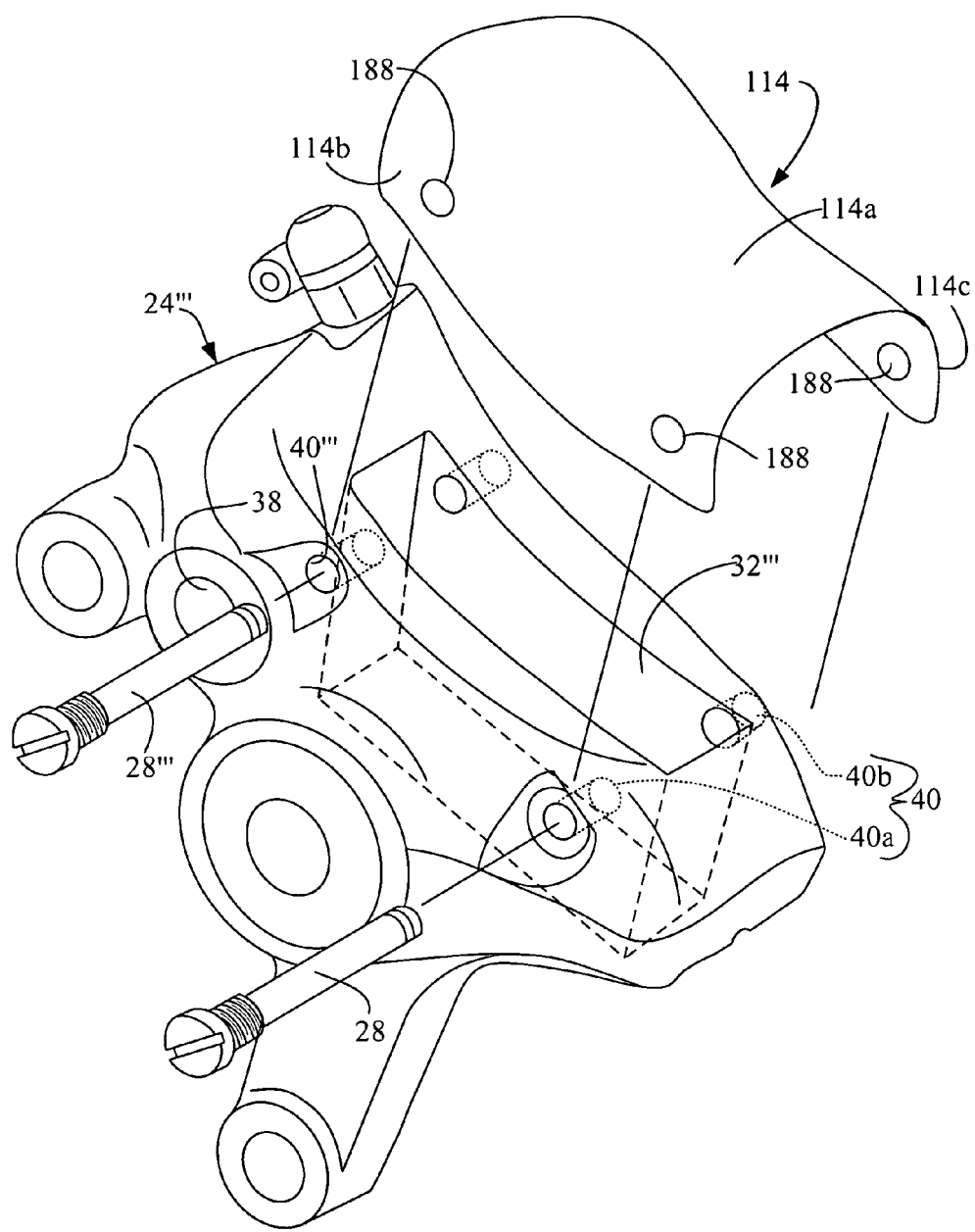
FIG. 24 is an exploded perspective view of a brake caliper assembly showing the cover, depicted in FIGS. 22 and 23, and a brake pad retaining member removed to reveal a brake pad access opening in accordance with the fourth embodiment of the present invention.
Figure 25:
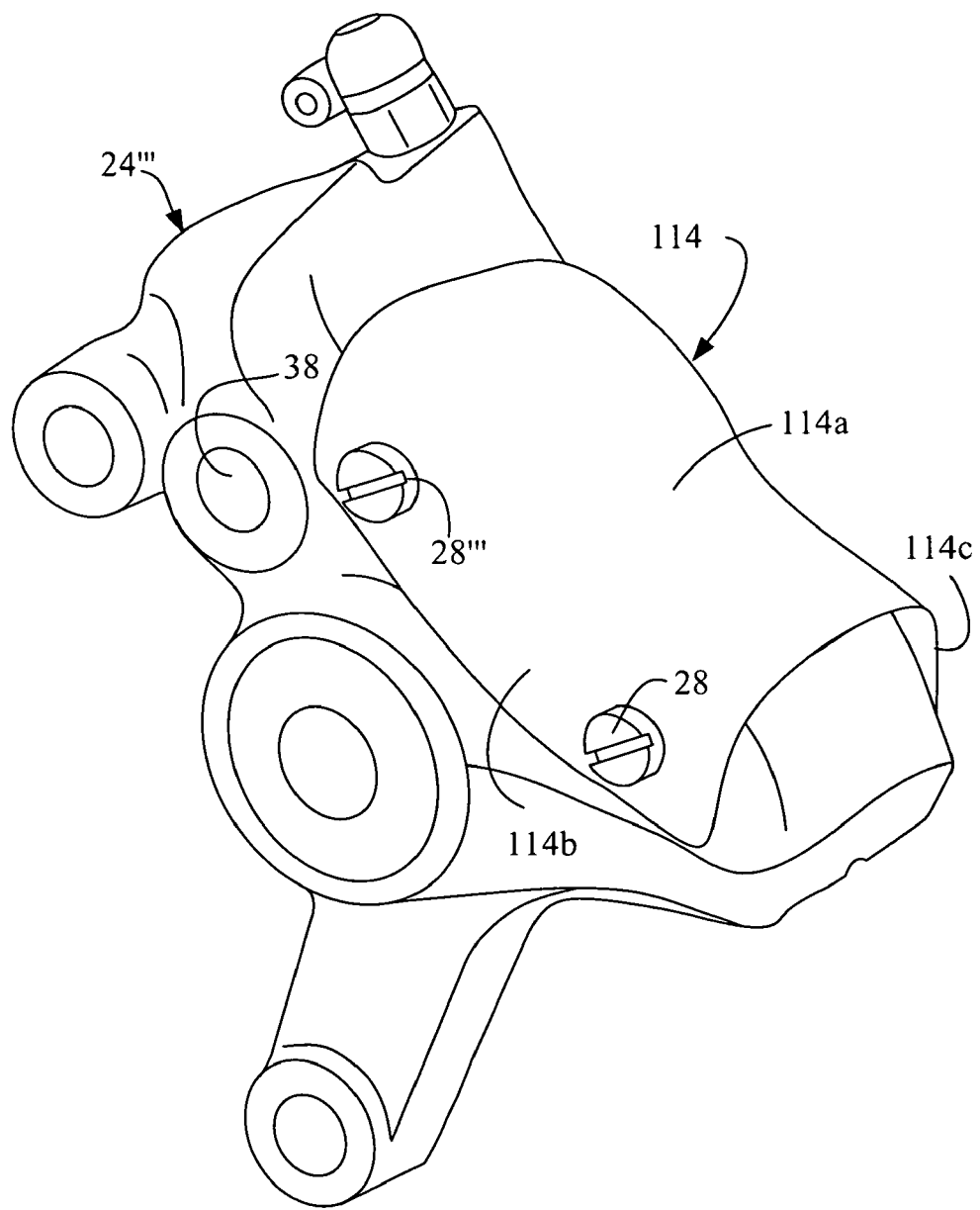
FIG. 25 is a perspective view of the brake caliper assembly with the cover installed in accordance with the fourth embodiment of the present invention.

The second brake pad retaining member 28''' is similarly installed in corresponding retaining member apertures 188 and the second retaining member aperture 40''', as indicated in FIGS. 24 and 25.

Alternative Embodiments

Alternative embodiments will now be described. In view of the similarity between the various embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity.

In one alternative embodiment, the retaining portion 84 can be formed with a pair of snap-on protrusions that engage the brake pad retaining member 28 in order to be retained in place.

In another embodiment, the cover 14 can be force fitted into the brake pad access opening 32 and retained therein by friction between the two side walls 72 of the cover 14 and the side walls 46 of the brake pad access opening 32 of the housing 24.

In another alternative embodiment, the cover 14 can be made of a metallic material and portions be deformed after insertion into the brake pad access opening 32 and retained by the deformed portions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle brake caliper assembly comprising:
a brake caliper configured to selectively apply a braking force on a bicycle brake disc, the brake caliper including housing with a brake pad access opening;
a brake pad retaining member removably installed on the brake caliper and extending into the brake pad access opening; and
a cover at least partially retained within the brake pad access opening of the housing by the brake pad retaining member, the cover including an attachment end having a generally straight edge and a retaining portion formed at the attachment end, the retaining portion having a movement restricting end extending perpendicularly away from the generally straight edge of the cover such that with the brake pad retaining member installed in the retaining portion and the brake caliper, the movement restricting end restricts movement of the cover within the brake pad access opening.

2. The bicycle brake caliper assembly as set forth in claim 1, wherein
the brake pad retaining member is a fastening pin that engages the retaining portion of the cover.

3. The bicycle brake caliper assembly as set forth in claim 2, wherein
the retaining portion of the cover includes a retaining member aperture; and
the brake pad retaining member extends through the retaining member aperture.

4. The bicycle brake caliper assembly as set forth in claim 1, wherein
the brake pad access opening is formed with a recess; and
the cover is formed with a protrusion, the protrusion extending into the recess with the cover installed in the brake pad access opening.

5. The bicycle brake caliper assembly as set forth in claim 1, wherein
the brake pad access opening is formed with a threaded aperture; and
the cover is formed with an aperture that is aligned with the threaded aperture with the cover installed in the brake pad access opening; and
a fastener extending through the aperture in the cover and threaded into the threaded aperture in the brake pad access opening.

6. A bicycle brake caliper assembly
a brake caliper configured to selectively apply a braking force on a bicycle brake disc, the brake caliper including housing with a brake pad access opening;
a brake pad retaining member removably installed on the brake caliper and extending into the brake pad access opening; and
a cover at least partially retained within the brake pad access opening of the housing by the brake pad retaining member, the cover including a cover portion and a retaining portion, the retaining portion extending in a direction generally perpendicular to the cover portion and into the brake pad access opening, the retaining portion being formed with a retaining member aperture, and the brake pad retaining member extending through the retaining member aperture.

7. The bicycle brake caliper assembly as set forth in claim 6, wherein
the cover portion includes an attachment end having a generally straight edge; and
the retaining portion is formed at the attachment end of the cover portion, the retaining portion having a movement restricting end that extends perpendicularly away from the generally straight edge of the cover portion such that with the brake pad retaining member installed in the retaining portion and the brake caliper, the movement restricting end limits movement of the cover within the brake pad access opening.

8. A bicycle brake caliper assembly comprising:
a brake caliper configured to selectively apply a braking force on a bicycle brake disc, the brake caliper including housing with a brake pad access opening;
a brake pad retaining member removably installed on the brake caliper and extending into the brake pad access opening; and
a cover covering the brake pad access opening of the housing and retained by the brake pad retaining member, the cover including an attachment end having a generally straight edge and a retaining portion formed at the attachment end having a movement restricting end that extends perpendicularly away from the generally straight edge of the cover such that with the brake pad retaining member installed in the retaining portion and the brake caliper, the movement restricting end restricts movement of the cover within the brake pad access opening.

9. The bicycle brake caliper assembly as set forth in claim 8, wherein
the brake pad retaining member is a fastening pin that engages the retaining portion of the cover.

10. The bicycle brake caliper assembly as set forth in claim 9, wherein
the retaining portion of the cover includes a retaining member aperture; and
the brake pad retaining member extends through the retaining member aperture.

11. The bicycle brake caliper assembly as set forth in claim 8, wherein
the brake pad access opening is formed with a recess; and
the cover is formed with a protrusion, the protrusion extending into the recess with the cover installed in the brake pad access opening.

12. The bicycle brake caliper assembly as set forth in claim 8, wherein
the brake pad access opening is formed with a threaded aperture; and
the cover is formed with an aperture that is aligned with the threaded aperture with the cover installed in the brake pad access opening; and
a fastener extending through the aperture in the cover and threaded into the threaded aperture in the brake pad access opening.

13. A bicycle brake caliper assembly comprising:
a brake caliper configured to selectively apply a braking force on a bicycle brake disc, the brake caliper including housing with a brake pad access opening;
a brake pad retaining member removably installed on the brake caliper and extending into the brake pad access opening; and
a cover covering the brake pad access opening of the housing and retained by the brake pad retaining member, the cover including a cover portion and a retaining portion, the retaining portion extending in a direction generally perpendicular to the cover portion and into the brake pad access opening, the retaining portion being formed with a retaining member aperture and the brake pad retaining member extending through the retaining member aperture.

14. The bicycle brake caliper assembly as set forth in claim 13, wherein
the cover portion includes an attachment end having a generally straight edge; and
the retaining portion is formed at the attachment end of the cover portion, the retaining portion having a movement restricting end that extends perpendicularly away from the generally straight edge of the cover portion such that with the brake pad retaining member installed in the retaining portion and the brake caliper, the movement restricting end limits movement of the cover within the brake pad access opening.

15. A bicycle brake caliper assembly comprising:
a brake caliper configured to selectively apply a braking force on a bicycle brake disc, the brake caliper including housing with a brake pad access opening;
a brake pad retaining member removably installed on the brake caliper and extending into the brake pad access opening;
a second brake pad retaining member; and
a cover covering the brake pad access opening of the housing and retained by the brake pad retaining member, the cover having a generally U-shaped structure with a top wall and two side walls extending from the top wall, the side walls being formed with pairs of retaining member apertures, the brake pad retaining member extending through one of the pairs of retaining member apertures and the second brake pad retaining member extending through the other of the pairs of retaining member apertures.

* * * * *